US012012126B2

(12) United States Patent
Kaiser et al.

(10) Patent No.: US 12,012,126 B2
(45) Date of Patent: Jun. 18, 2024

(54) CALIBRATION BASED ON SEMANTIC OBJECTS

(71) Applicant: Zoox, Inc., Foster City, CA (US)

(72) Inventors: Nathaniel Jon Kaiser, Foster City, CA (US); Till Kroeger, San Francisco, CA (US); Elena Stephanie Stumm, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 244 days.

(21) Appl. No.: 17/119,562

(22) Filed: Dec. 11, 2020

(65) Prior Publication Data

US 2022/0185331 A1 Jun. 16, 2022

(51) Int. Cl.
*B60W 60/00* (2020.01)
*B60W 50/00* (2006.01)
*B60W 50/02* (2012.01)
*B60W 50/04* (2006.01)
*G06F 18/24* (2023.01)
*G06V 20/40* (2022.01)
*G06V 20/56* (2022.01)

(52) U.S. Cl.
CPC .... *B60W 60/0018* (2020.02); *B60W 50/0205* (2013.01); *B60W 50/045* (2013.01); *G06F 18/24* (2023.01); *G06V 20/41* (2022.01); *G06V 20/56* (2022.01); *B60W 2050/0083* (2013.01); *B60W 2556/45* (2020.02)

(58) Field of Classification Search
CPC ......... B60W 60/0018; B60W 50/0205; B60W 50/045; B60W 2556/45; B60W 2050/0083; G06V 20/41; G06V 20/56; G06K 9/6267; G06K 9/00718; G06K 9/00791

See application file for complete search history.

(56) References Cited

U.S. PATENT DOCUMENTS 10,298,910 B1 * 5/2019 Kroeger .................. G06T 11/60
10,554,521 B1   2/2020 Terechko et al.
10,794,710 B1 * 10/2020 Liu ........................ G06V 20/58
(Continued)

OTHER PUBLICATIONS

Office Action for U.S. Appl. No. 17/119,518, dated Aug. 8, 2022, Kaiser, "Localization Based on Semantic Objects", 10 pages.
(Continued)

*Primary Examiner* — Aniss Chad
*Assistant Examiner* — Christopher George Fees
(74) *Attorney, Agent, or Firm* — Lee & Hayes, P.C.

(57) ABSTRACT

Techniques for determining a location of a vehicle in an environment using sensors and determining calibration information associated with the sensors are discussed herein. A vehicle can use map data to traverse an environment. The map data can include semantic map objects such as traffic lights, lane markings, etc. The vehicle can use a sensor, such as an image sensor, to capture sensor data. Semantic map objects can be projected into the sensor data and matched with object(s) in the sensor data. Such semantic objects can be represented as a center point and covariance data. A distance or likelihood associated with the projected semantic map object and the sensed object can be optimized to determine a location of the vehicle. Sensed objects can be determined to be the same based on matching with the semantic map object. Epipolar geometry can be used to determine if sensors are capturing consistent data.

20 Claims, 7 Drawing Sheets

(56) References Cited

U.S. PATENT DOCUMENTS

| | | | |
|---|---|---|---|
| 11,067,693 B2* | 7/2021 | Walls | G06V 20/56 |
| 11,157,527 B2 | 10/2021 | Wang et al. | |
| 11,195,418 B1 | 12/2021 | Hong et al. | |
| 11,340,079 B1* | 5/2022 | Ebrahimi Afrouzi | G06V 20/56 |
| 2017/0032526 A1* | 2/2017 | Gao | G06T 7/246 |
| 2018/0188043 A1* | 7/2018 | Chen | G05D 1/0246 |
| 2018/0348346 A1* | 12/2018 | Vallespi-Gonzalez | |
| | | | G01S 13/931 |
| 2019/0232955 A1* | 8/2019 | Grimm | G06V 10/803 |
| 2019/0258737 A1* | 8/2019 | Wang | G01C 21/3848 |
| 2019/0347821 A1 | 11/2019 | Stein | |
| 2020/0020126 A1 | 1/2020 | Kitago et al. | |
| 2020/0082180 A1* | 3/2020 | Wang | G06T 7/80 |
| 2020/0133272 A1 | 4/2020 | Chong | |
| 2020/0372285 A1 | 11/2020 | Adams et al. | |
| 2020/0372623 A1 | 11/2020 | Lawlor et al. | |
| 2021/0063162 A1* | 3/2021 | Moskowitz | G01C 21/28 |
| 2021/0064056 A1* | 3/2021 | Rosenberg-Biton | G08G 1/143 |
| 2021/0078593 A1* | 3/2021 | Lee | G06V 20/56 |
| 2021/0253129 A1* | 8/2021 | Williams | B60W 60/0018 |
| 2021/0329221 A1* | 10/2021 | Arbabian | H04N 13/239 |
| 2021/0372808 A1* | 12/2021 | Taieb | G01C 21/3841 |
| 2022/0066006 A1* | 3/2022 | Abari | G01S 17/86 |
| 2022/0189054 A1 | 6/2022 | Kaiser et al. | |

OTHER PUBLICATIONS

International Search Report and Written Opinion for PCT Application No. PCT/US21/60997, dated Feb. 24, 2022, 10 pages.
Bao et al., "Semantic Structure from Motion with Object and Point Interactions", 2011 IEEE Intl Conf on Computer Vision Workshops, Nov. 2011, 8 pgs.

* cited by examiner

CALIBRATION BASED ON SEMANTIC OBJECTS

BACKGROUND

Data can be captured in an environment and represented as a map of the environment. Often, such maps can be used by vehicles navigating within the environment, although the maps can be used for a variety of purposes. Vehicles can capture sensor data and can determine a location of the vehicle relative to the map. As such, it is important for the sensors to be calibrated, to provide accurate input to vehicle computing systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
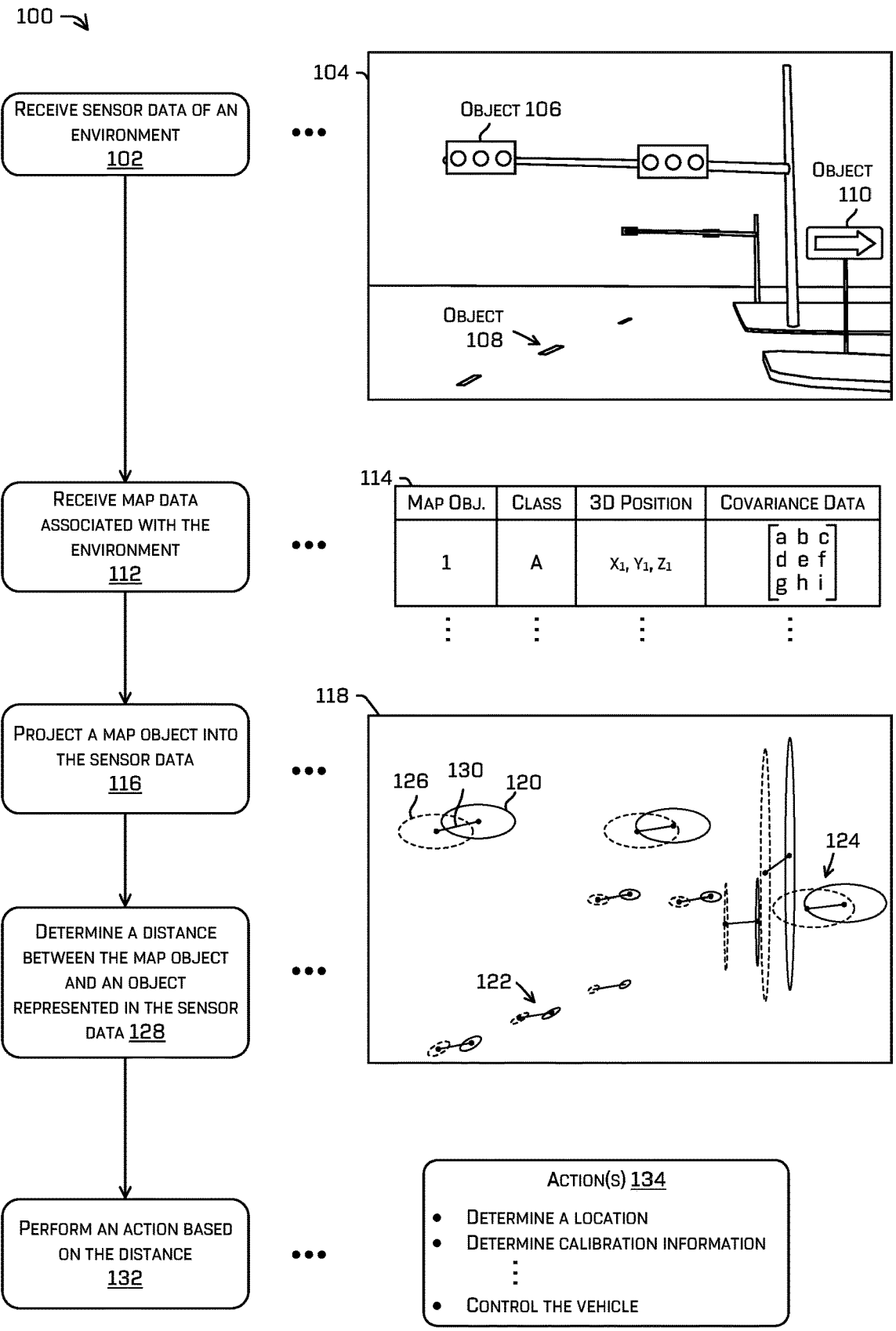
FIG. 1 is a pictorial flow diagram of an example process of capturing sensor data, projecting map data into the sensor data, determining a distance based on the sensor data and map data, and performing an action based on the distance.

Techniques for determining a location of a vehicle in an environment using sensors and determining calibration information associated with the sensors are discussed herein. In some examples, a vehicle can determine a location in an environment based on map data. The map data can comprise data about semantic objects in an environment. Such semantic objects can include "generic" features such as traffic lights, lane markings, and the like. The vehicle can use a sensor, such as an image sensor, to capture sensor data representing an environment. Map data representing the semantic objects can be projected into the sensor data and matched with object(s) represented in the sensor data. Such semantic objects can be represented in the image data as a center point and can be associated with covariance data. A distance between the semantic object projected into the sensor data and the object represented in the sensor data can be minimized to determine a location of the vehicle in the environment.

In some examples, the semantic map data can be used to determine calibration information about sensors used to capture sensor data. In some examples, a vehicle may include a first sensor having a first field of view and a second sensor having a second field of view at least partially overlapping the first field of view. First sensor data can be captured representing a first object in the environment and second sensor data can be captured representing a second object in the environment. Based on the semantic map data, the first object in the first sensor data can be determined to correspond to the second object in the second sensor data. Accordingly, a particular point (e.g., a center point) of the first object in the first sensor data can correspond to the particular point of the second object in the second sensor data. Based on calibration data, a distance between the particular point and an epipolar line can be determined. Distances over time can be captured and used to determine an error statistic regarding whether the first sensor and the second sensor are consistent or otherwise calibrated.

In some examples, an error statistic can be used to predict a performance of a sensor and/or can indicate when a sensor may fail. In some examples, predictive maintenance can be scheduled, initiated, or otherwise determined based on such historical data metrics.

In some examples, an environment can be represented using map data. The map data can represent semantic objects, which may include "generic" objects such as traffic lights, poles, signs, lane markings (also referred to as a lane marker), and the like. Semantic objects or semantic map data can be represented as a three-dimensional location and covariance data. Such semantic objects can be associated with a particular semantic class (e.g., a classification type such as traffic light, light, pole, lane marking, etc.).

In some examples, an initial location of a vehicle in an environment can be determined. Such an initial location can be determined based on other sensor data such as GPS data, lidar data, IMU data, etc., or can be based on a previously determined location. Based on the initial location and/or on a classification type of semantic object, a list of map objects can be loaded into memory or otherwise considered when matching the map object to an object represented by the sensor data. In some examples, map objects can be considered based the map object being within a threshold distance of the vehicle. In some cases, a threshold distance can be based at least in part on a classification type and/or a frequency of object(s) in an environment. For example, there may be a relatively high number of lane markings in an environment, and accordingly, the threshold distance for considering lane marking may be relatively lower than another semantic object such as traffic lights. By way of example and without limitation, a threshold distance for loading map data representing lane markings may be 50 meters, while a threshold distance for loading map data representing traffic lights may be 100 meters, although other distance values are considered.

In some examples, sensor data can be captured by sensors having overlapping fields of view. In such an example, sensor data can be captured substantially simultaneously. Accordingly, a change of position between capturing sensor data can be minimized, and a map location and/or calibration information can be determined without considering a change in orientation and/or location of the vehicle. Calibration information can be determined with respect to two sensors, three sensors, or any number of sensors.

In some examples, sensor data can be captured by sensors having non-overlapping fields of view. In such an example, first sensor data of an object can be captured at a first time by a first sensor and second sensor data can be captured at a second time by a second sensor when the object is in the field of view of the second sensor. Accordingly, the change in orientation and/or location of the vehicle can be used to translate the location of the object in the first sensor data to the second sensor data. Thus, calibration information can be determined for sensors having different fields of view. Further, calibration information can be determined for any group of sensors (e.g., at least two) having overlapping or non-overlapping fields of view.

The localization and calibration techniques described herein can improve a functioning of a computing device by providing a robust method of determining a position in a world and determine inconsistent sensor data. In the context of localization, the techniques discussed herein can provide an orthogonal localization system that can be used separately from or in combination with another localization system. In some cases, the use of semantic map features can provide for smaller data sizes of maps relative to mesh-based maps, which may allow memory or processing power to be used for other operations. Further, safe trajectories may be planned by knowing a position of a vehicle in an environment. In the context of calibration, using semantic features to determine that an object in one sensor data is the same as the object in another sensor data provides for a robust method of identifying common features for subsequent calibration. Calibration information can be used to determine when sensor(s) are out of alignment or when calibration data is incorrect, which can avoid problems for other operations such as fusing data, segmenting, classifying, and tracking data, which may be difficult or impossible without calibrated sensors. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques can be utilized in a manufacturing assembly line context, in an aerial surveying context, or in a nautical context. Additionally, the techniques described herein can be used with real data (e.g., captured using sensor(s)), simulated data (e.g., generated by a simulator), or any combination of the two.

FIG. 1 is a pictorial flow diagram of an example process 100 of capturing sensor data, projecting map data into the sensor data, determining a distance based on the sensor data and map data, and performing an action based on the distance.

An operation 102 can include receiving sensor data of an environment. An example of such sensor data is illustrated as image data 104. The image data 104 can include any number and type of objects. As illustrated, the image data 104 includes an object 106 (e.g., a traffic light), an object 108 (e.g., a lane marking), and an object 110 (e.g., a sign). Although discussed in the context of image data, the operation 102 can include receiving lidar data, radar data, audio data, time of flight data, and the like. Further, the operation 102 can include receiving sensor data from a single sensor or multiple sensors. The operation 102 can include receiving sensor data associated with a single time (or sensor data associated with substantially the same time, based on technical tolerances) or sensor data captured over a period of time. In some examples, the operation 102 can be performed by an autonomous vehicle as it traverses the environment.

In some examples, the operation 102 can include detecting objects, classifying objects, determining bounding boxes associated with objects, and the like. Further, the operation 102 can include determining a center point of such objects as well as covariance data associated with the objects. In some examples, the covariance data can be based on or can be associated with extents (e.g., length, width, height) of the objects. The operation 102 can include receiving or otherwise determining a two-dimensional bounding box and/or a three-dimensional bounding box associated with an object represented in the sensor data. The center point of an object and covariance data can be used in other operations, discussed below.

An operation 112 can include receiving map data associated with the environment. An example of such map data is illustrated as map data 114. In some examples, the map data 114 can represent semantic objects in an environment. Such semantic objects may be "generic" objects such as traffic lights, lane markings, poles, signs, trees, fire hydrants, electrical components (e.g., transformers, electrical boxes), mailboxes, parking meters, bike racks, trees, billboards, and the like. In some examples, the map data 114 can include an identifier of the object, an indication of the classification type of the object (e.g., traffic light, lane marking, sign, etc.), a three-dimensional position of the object in the environment, and covariance data associated with the object, etc. In some examples, the map data 114 can include an extent of the object (e.g., length, width, height) and/or any other information about an object.

In some examples, the map data can be generated based on lidar data or other image data. For example, examples of generating such map data can be found, for example, in U.S. patent application Ser. No. 15/913,647 titled "Mesh Decimation based on Semantic Information" and filed Mar. 8, 2018, and U.S. patent application Ser. No. 16/698,336 titled "Updating Map Data" and filed Nov. 27, 2019, the entirety of both of which are herein incorporated by reference in their entirety for all purposes.

In some examples, the operation 112 can include determining an initial position of the vehicle, which may be based on an earlier location, an estimated position, a coarse position estimate, other sensor modalities, and the like. Further, the operation 112 can include receiving map objects based on a classification type and/or a threshold distance of the map objects to another location, such as a location associated with the vehicle. Additional details of loading or otherwise receiving map data are discussed in connection with FIG. 3, as well as throughout this disclosure.

An operation 116 can include projecting a map object into the sensor data. In some examples, the operation 116 can include projecting the map object into the sensor data based at least in part on the three-dimensional position of the map object, a pose (e.g., a position and/or orientation) of the vehicle, and/or a pose of the sensor. A map object may represent one of many objects of the map data received in the operation 112. In some examples, the operation 116 can be based at least in part on an estimated and/or expected location of the vehicle in an environment. In some examples, the estimated position can be based on a previously determined position that has been updated based on expected motion in an environment (e.g., based on data from an inertial motion unit (IMU), based on data extrapolated from IMU data, and the like).

In some examples, a three-dimensional position of a map object can be projected into sensor data as a two-dimensional center point. In some examples, three-dimensional covariance data can be projected into sensor data as two-dimensional covariance data.

An example of map objects projected into the sensor data is illustrated as an example 118.

The example 118 includes representations of the object(s) represented in the image data 104 and representations of the map data projected into the sensor data, as well as other data. For instance, the example 118 represents the object 106 as covariance data 120 (also referred to as an object 120) and an associated center point. The example 118 represents the object 108 as covariance data 122 and an associated center point. The example 118 represents the object 110 as covariance data 124 and an associated center point.

The example 118 further illustrates a map object 126 projected into the image data 104. For ease of visualization, some map objects have not been labeled in FIG. 1.

In some examples, the operation 116 includes matching map object(s) with corresponding object(s) represented in the sensor data. For example, map objects can be matched with objects based on a Hungarian assignment method, a greedy search algorithm, a nearest-neighbor algorithm, object locations, extents, classifications, and the like.

In some examples, map objects must have the same classification type as the object in the sensor data as a precondition for matching.

In some examples, the operation 116 includes matching map object(s) with objects represented in the sensor data (also referred to as "sensed object") based at least in part on classification data, center point location(s), covariance data, and the like.

An operation 128 can include determining a distance between the map object and an object represented in the sensor data. For example, once the map object 126 is matched or otherwise determined to be associated with the covariance data 120, a distance between the two objects can be determined. For example, a distance 130 can represent the distance between the first center point associated with the object 126 and a second center point associated with the covariance data 120.

In some examples, the distance 130 can represent a Mahalanobis distance. In some examples, the distance 130 can represent a distance in pixels or a Euclidian distance.

In some examples, the operation 128 can include determining a likelihood that the map object corresponds to the sensed object. In some examples, the likelihood can be determined in addition to or instead of the distance 130. In some examples, the likelihood can be based at least in part on a logarithm of covariance data associated with a mapped object and/or a sensed object. In some examples, the likelihood can represent a logarithm of the absolute value of covariance data associated with a mapped object and/or a sensed object. In some examples, negating the likelihood can represent a distance. In some examples, a likelihood that a map object corresponds to a sensed object is based at least in part on a Mahalanobis distance and a size of a covariance associated with a mapped object or a sensed object. That is, objects with a larger covariance may be associated with a larger distance, thereby reducing the likelihood that the map object correspond to the sensed object.

The operation 128 can include determining distance(s) for some or all objects represented in the sensor data and associated with map data. For example, the operation 128 can include determining distances between map objects and sensor data associated with the objects 108 and 110, as well as other unnumbered objects.

An operation 132 can include performing an action based on the distance. Example action(s) 134 can include, but are not limited to, determining a location, determining a calibration, controlling the vehicle, and the like.

In the context of determining a location, the distance(s) can be input to a state graph associated with a state of the vehicle and a location of the vehicle can be determined based on minimizing the distances between map object(s) and sensed object(s). In some examples, the distance data can be used in connection with other lidar data, radar data, and the like to determine a location of the vehicle. In some examples, determining a location can be based on a SLAM (simultaneous localization and mapping) algorithm, particle filtering, and the like. In some examples, the operations discussed herein can be performed to provide an independent location estimate that to provide redundancy to another localization algorithm.

Figure 2:
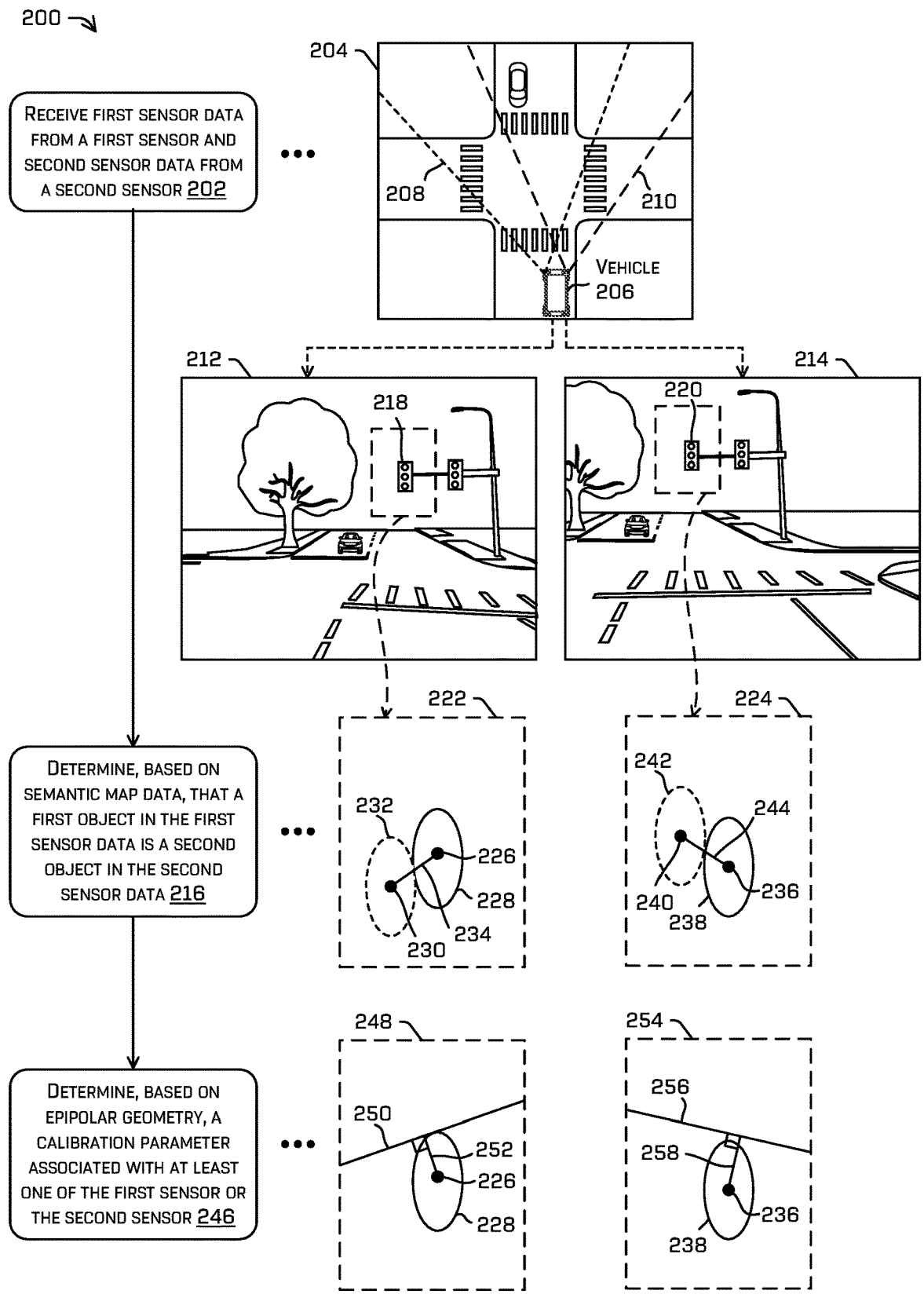
FIG. 2 is a pictorial flow diagram of an example process of capturing sensor data, determining that a first object corresponds to a second object, and determining a calibration parameter based on epipolar geometry.

Additional details of determining calibration information are provided in connection with FIG. 2, as well as throughout this disclosure.

In the context of controlling the vehicle, in some examples, the action can include generating a trajectory, altering or modifying a trajectory, initiating a safe-stop trajectory, sending a request for instruction to a remote operator, and the like.

FIG. 2 is a pictorial flow diagram of an example process 200 of capturing sensor data, determining that a first object corresponds to a second object, and determining a calibration parameter based on epipolar geometry.

At operation 202, the process includes receiving first sensor data from a first sensor and second sensor data from a second sensor. An example 204 illustrates a top-down view of a scene showing a vehicle 206 at an intersection in an environment. First dashed lines 208 (illustrated with half-dashed lines) represent a field of view of a first sensor and second dashed lines 210 (illustrated with full dashed lines) represent a second field of view of a second sensor. In the context of image data, an example of image data captured by the first image sensor (e.g., a left image sensor) is illustrated as image data 212. An example of image data captured by the second image sensor (e.g., a right image sensor) is illustrated as image data 214.

Although discussed in the context of image data, the operation 202 can include receiving lidar data, radar data, audio data, time of flight data, and the like.

The particular orientation of sensors illustrated in the example 204 is not limiting and the vehicle 206 can include any number of sensors having any combination of fields of view (or sensed areas).

The image data 212 represents image data associated with the field of view associated with the first dashed lines 208. The image data 214 represents image data associated with the field of view associated with the second dashed lines 210.

An operation 216 can include determining, based on semantic map data, that a first object in the first sensor data is a second object in the second sensor data. For example, the operation 216 can include operations similar to those discussed in the context of FIG. 1. That is, the operation 216 can include, but is not limited to, detecting object(s) in the image data 212 and/or 214, receiving map data, determining a center point associated with object(s), determining covariance data associated with object(s), determining that a semantic object corresponds to (e.g., based on a Hungarian algorithm, distances between points, or some other matching algorithm) an object in the sensor data, and determining that two objects represented in the image data 212 and 214 are the same object. Additional details are provided with respect to objects 218 and 220, discussed below.

The image data 212 includes a representation of the object 218, while the image data 214 includes a representation of the object 220. A detail view of associated with the image data 212 comprising the object 218 is provided in an example 222. A detail view associated with the image data 214 comprising the object 220 is provided in an example 224.

For instance, the example 222 illustrates center points and covariance data associated with the object 218 and with semantic map data associated with the object 218. For example, the object 218 is represented in the example 222 by a center point 226 and covariance data 228. A semantic map object is represented in the example 222 as a center point 230 and covariance data 232.

The operation 216 can include determining a distance 234 between the center points 226 and 230. In some examples, the distance 234 is based at least in part on the center points 226 and 230 and/or the covariance data 228 and 230. In some examples, the distance 234 can correspond to a Mahalanobis distance.

The example 224 illustrates center points and covariance data associated with the object 220 and the semantic map data associated with the object 220. For example, the object 220 is represented in the example 224 by a center point 236 and covariance data 238. A semantic map object is represented in the example 224 as a center point 240 and covariance data 242.

The operation 216 can further include determining a distance 244 between the center points 236 and 240. In some examples, the distance 244 is based at least in part on the center points 236 and 240 and/or the covariance data 238 and 240. In some examples, the distance 244 can correspond to a Mahalanobis distance.

Accordingly, because the objects 218 and 220 can be determined to correspond to the same object, the center points 226 and 236 can be used in further operations, discussed below.

An operation 246 can include determining, based at least in part on epipolar geometry, a calibration parameter associated with at least one of the first sensor or the second sensor.

An example 248 illustrates a detail view of the object 218 represented by the center point 226 and the covariance data 228. The example 248 further illustrates an epipolar line 250. The epipolar line 250 can be based on a calibration parameter or a function (e.g., a transfer function), and can represent a line upon which a point from the image data 214 can be projected into the image data 212. That is, if a calibration between image sensors capturing the image data 212 and 214 were perfect, the center point 226 would align with the epipolar line 250. However, the operation 246 can include determining a distance 252 between the center point 226 and the epipolar line 250. In some examples, the distance 252 can represent a shortest distance between the center point 226 and the epipolar line 250.

In some examples, the epipolar line 250 can be associated with variance data or covariance data based at least in part on sensed object(s) (e.g., associated with the covariance data 228 and/or 238).

Similarly, the operation 246 is illustrated with respect to the image data 214 in an example 254. The example 254 illustrates a detail view of the object 220 represented by the center point 236 and the covariance data 238. The example 254 further illustrates an epipolar line 256. The epipolar line 256 can be based on a calibration parameter or a function, and can represent a line upon which a point from the image data 212 can be projected into the image data 214. That is, if a calibration between image sensors capturing the image data 212 and 214 were perfect, the center point 236 would align with the epipolar line 256. However, the operation 246 can include determining a distance 258 between the center point 226 and the epipolar line 256. In some examples, the distance 258 can represent a shortest distance between the center point 236 and the epipolar line 256.

In some examples, the distances 252 and 256 can both be determined, while in some examples, one of the distance 252 or 256 can be determined. In some instances, the distance 252 and/or 256 can correspond to a Euclidian distance.

In some examples, the operation 246 can include projecting the image data 212 and/or 214 into a virtual camera space to remove lens distortion and to ensure that the image data is linear.

The distances 252 and 256 can be determined and tracked over time. For example, distances can be determined for sensor data captured over a period of time such as seconds, hours, days, weeks, etc. The distance values can be averaged or otherwise statistically accumulated to determine an error over time.

In some examples, an instantaneous distance value meeting or exceeding a first threshold value can indicate that the image data 212 and 214 is inconsistent, which may indicate a calibration error. In some examples, an error over time meeting or exceeding a second threshold value can indicate that the image data 212 and 214 is inconsistent, which may indicate a calibration error. In some examples, the first threshold value can be the same or different as the second threshold value. In some examples, sensors can comprise a calibration state of being consistent or inconsistent with respect to other sensors.

In some examples, the operation 246 may include, actions based on the calibration parameter. These actions may include, but are not limited to, following a trajectory (e.g., without modification of the trajectory), reducing (e.g., down weighting) a confidence level associated with the sensor data or data derived from the sensor data (e.g., bounding boxes, extents, pose, velocity, classification data, segmentation data, prediction data, etc.), initiating a cleaning operation, scheduling maintenance (e.g., which may include sending an indication of the calibration parameter and/or the sensor data to a remote computing device), reducing a velocity associated with a trajectory (or modifying some other aspect of the trajectory), generating a stopping trajectory, and the like.

Although discussed in the context of image data from two sensors, any number of sensors and/or image data can be used to determine calibration data. Additional details are discussed below in connection with FIGS. 4A and 4B, as well as throughout the disclosure.

Figure 3:
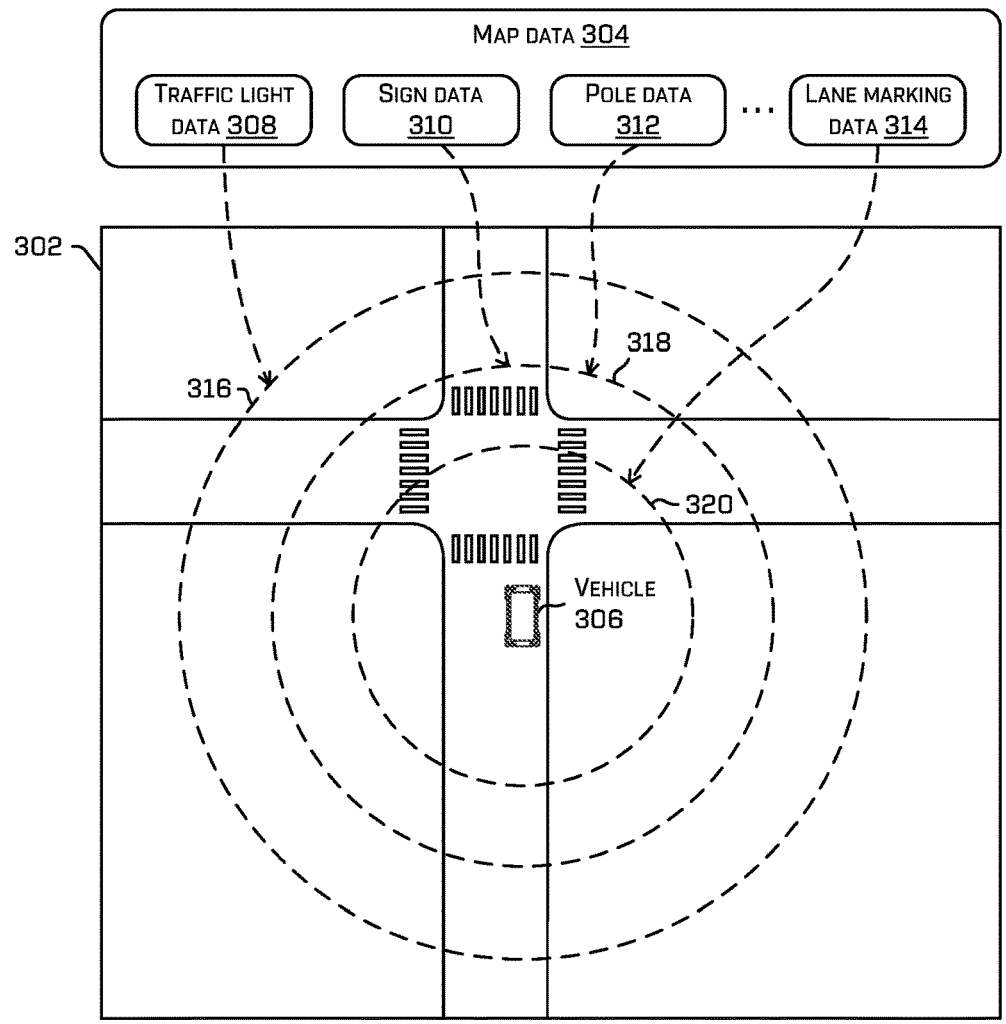
FIG. 3 is an illustration of an example of determining map data based on object type and distance.

FIG. 3 is an illustration of an example 300 of determining map data based on object type and distance.

The example 300 illustrates a top-down view of an environment 302 and map data 304. The environment 302 may include a vehicle 306, such as an autonomous vehicle.

The map data 304 may include data associated with different semantic objects (also referred to as semantic map objects), such as traffic light data 308, sign data 310, pole data 312, lane marking data 314, and the like. Of course, the map data 304 may include data associated with other semantic objects, and are not limited to the examples discussed herein.

Techniques discussed herein (e.g., the operations 112 and/or 216) can include receiving, loading, or otherwise determining map data based on a location of the vehicle 306.

In some examples, map data can be received, loaded, or otherwise determined based on a proximity of map objects represented in the map data to the vehicle 306. For example, map data can be received based on a location of the map object (e.g., a three-dimensional position) being within a threshold distance to the vehicle 306.

In some examples, a threshold distance can be based on a type of semantic map object. For example, the traffic light data 308 can be associated with a first threshold distance 316, the sign data 310 and the pole data 312 can be associated with a second threshold distance 318, and the lane marking data 314 can be associated with a third threshold distance 320. Of course, the sign data 310 and the pole data 312 can be associated with individual threshold distances and they do not need to be the same. In some cases, the various thresholds can be any size or shape and are not limited to the examples expressly described herein.

Further, the threshold distance(s) can be based generally on a classification type and/or can be based on a particular location on a map. For example, a first location may have a first frequency or number of semantic objects and a second location may have a second frequency or number of the semantic objects that is lower than the first frequency. In some examples, a first threshold distance associated with the first location may be less than a second threshold distance associated with the second location. However, the first and second thresholds may be the same or the first threshold distance can greater than the second threshold distance.

In some examples, receiving, loading, or otherwise determining map data can be based on a number of semantic objects in total (e.g., within a threshold distance of the vehicle), a number of semantic objects associated with a particular object type within a threshold distance, a localization accuracy, an algorithm used to match map objects and objects represented by the sensor data, a distance associated with an object represented in the sensor data (e.g., the greatest distance, average distance, etc. between a sensed object and the vehicle), visibility with respect to other sensors (e.g., associated with an occlusion map), and the like. Additional examples of loading map data into working memory can be found, for example, in U.S. patent application Ser. No. 16/022,048 titled "Multi-Resolution Maps for Localization" and filed Jun. 28, 2018, the entirety of which is herein incorporated by reference in its entirety for all purposes.

Figure 4A:
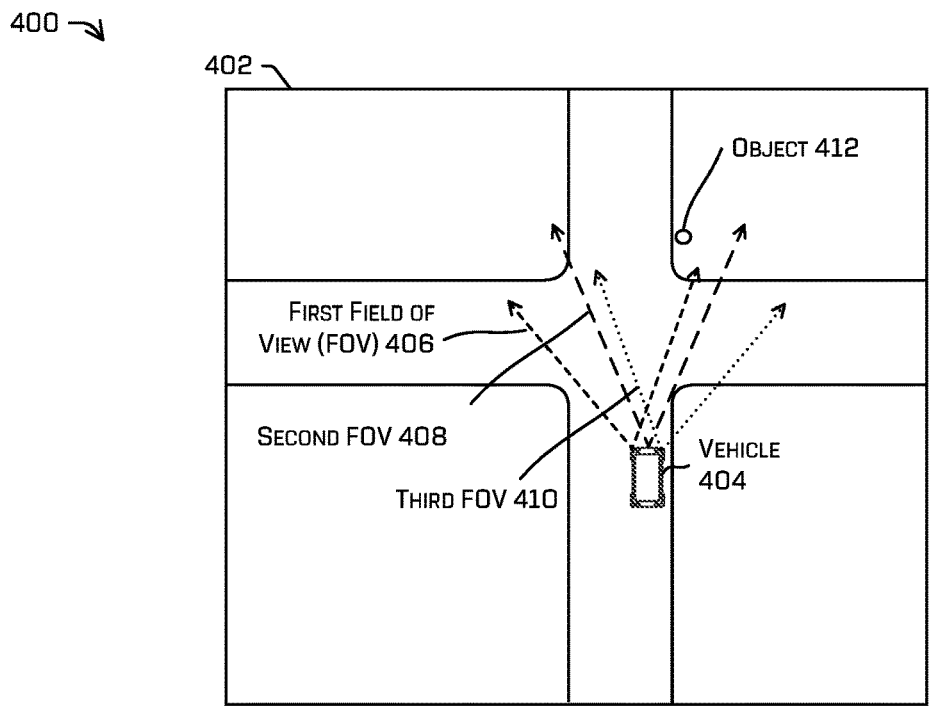
FIG. 4A is an illustration of capturing sensor data representing an object using a plurality of sensors comprising at least partially overlapping fields of view.

FIG. 4A is an illustration 400 of capturing sensor data representing an object using a plurality of sensors comprising at least partially overlapping fields of view.

An environment 402 illustrates a vehicle 404 comprising sensors with a first field of view (FOV) 406, a second FOV 408, and a third FOV 410. As illustrated, the environment 402 includes an object 412 positioned such that the object 412 can be represented in sensor data associated with the FOVs 406, 408, and 410.

In some examples, the vehicle 404 can use the techniques discussed herein to determine a location and/or determine calibration parameter(s). That is, data from multiple sensors can be captured substantially simultaneously and used with the techniques discussed herein. In some examples, calibration parameters can be determined for different pairs of sensors and/or can be determined for a group of sensors to determine if a sensor is miscalibrated with respect to the other sensors.

Figure 4B:
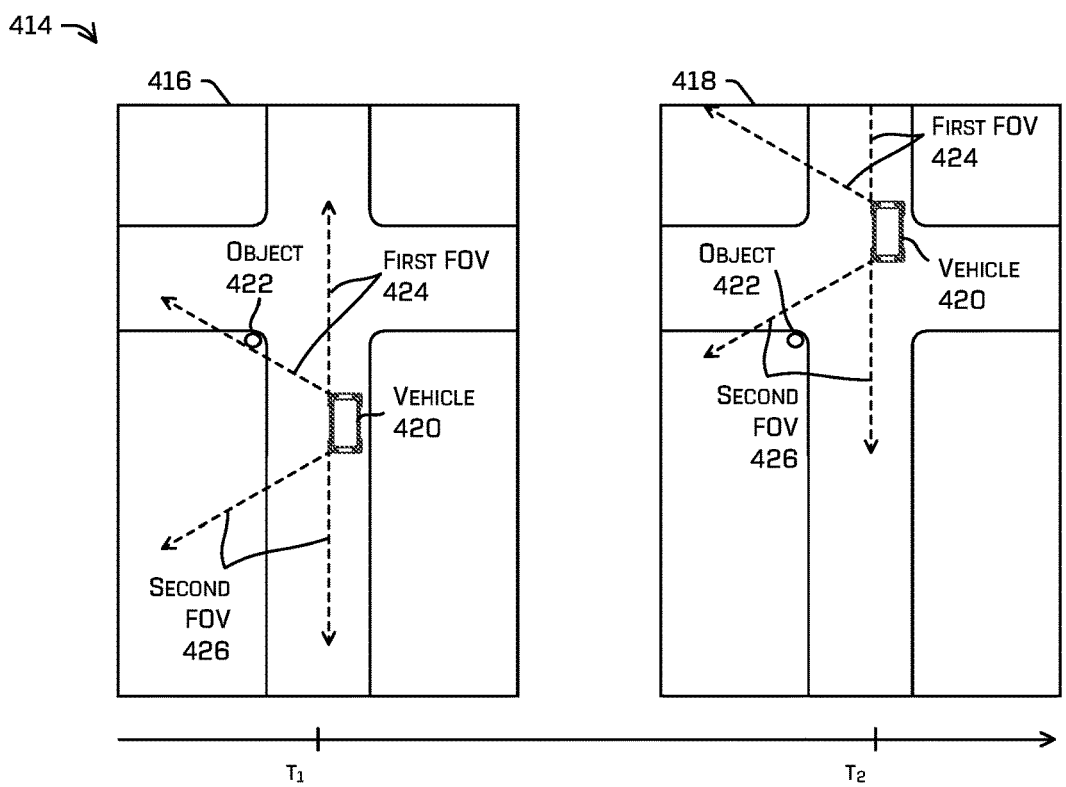
FIG. 4B is an illustration of capturing sensor data representing an object using a plurality of sensors comprising non-overlapping fields of view.

FIG. 4B is an illustration 414 of capturing sensor data representing an object using a plurality of sensors comprising non-overlapping fields of view.

For example, an example 416 illustrates an environment at a first time $T_1$ and an example 418 illustrates an environment at a second time $T_2$ after the first time. At the first time $T_1$, a vehicle 420 can capture sensor data of an object 422 with a sensor associated with a first field of view 424. In some examples, the vehicle 420 may comprise a plurality of sensors capturing different fields of view. For example, the vehicle 420 may include a second sensor associated with a second field of view 426 that does not overlap the first field of view 424. Accordingly, the object 422 is not represented in any sensor data associated with the second field of view at time $T_1$.

As illustrated in the example 418, the vehicle 420 can move through an environment from the first time $T_1$ to the second time $T_2$ such that the object 422 may be represented by second sensor data associated with the second field of view 426 at time $T_2$.

Accordingly, the techniques discussed herein can include determining a location and/or determining a calibration parameter based at least in part on sensor data captured in the examples 416 and 418. That is, a first location can be determined using the sensor data representing the object 422 captured at the first time and a second location can be determined using the sensor data representing the object 422 captured at the second time. A change in location and orientation of the vehicle between the first time and the second time can be used to account for the motion between the times.

Similarly, the sensor data representing the object 422 captured at the first time and the sensor data representing the object 422 captured at the second time can be used to determine a calibration parameter of one or more sensors of the vehicle. A change in location and orientation of the vehicle between the first time and the second time can be used to account for the motion between the times.

Figure 5:
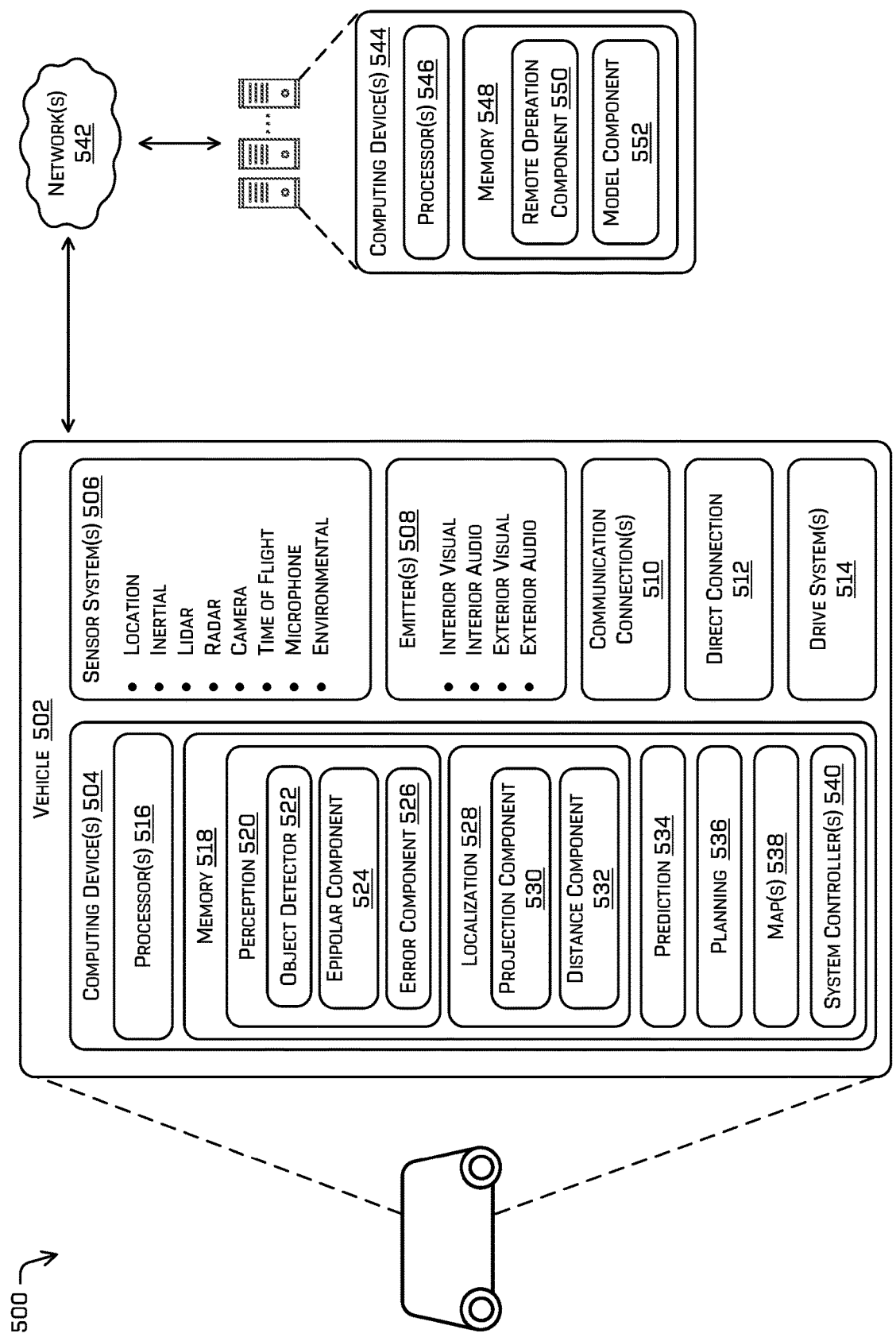
FIG. 5 depicts a block diagram of an example system for implementing the techniques described herein.

FIG. 5 depicts a block diagram of an example system 500 for implementing the techniques described herein. In at least one example, the system 500 can include a vehicle 502. In the illustrated example system 500, the vehicle 502 is an autonomous vehicle; however, the vehicle 502 can be any other type of vehicle.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment.

The one or more sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., a remote teleoperation computing device) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external networks 542 (e.g., the Internet). For example, the one or more communications connection(s) 510 can enable wireless network based communication such as via frequencies defined by the IEEE 802.11 standards, short range wireless frequencies such as Bluetooth®, cellular communication (e.g., 2G®, 3G®, 4G®, 4G LTE®, 5G®, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of the drive system(s) 514. Furthermore, the drive system(s) 514 also include one or more communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a perception component 520 comprising an object detector 522, an epipolar component 524, and an error component 526, a localization component 528 comprising a projection component 530 and a distance component 532, a prediction component 534, a planning component 536, a maps component 538, and one or more system controller(s) 540. Though depicted as residing in the memory 518 for illustrative purposes, it is contemplated that the perception component 520, the object detector 522, the epipolar component 524, the error component 526, the localization component 528, the projection component 530, the distance component 532, the prediction component 534, the planning component 536, the maps component 538, and the one or more system controller(s) 540 can additionally, or alternatively, be accessible to the computing device 504 (e.g., stored in a different component of vehicle 502) and/or be accessible to the vehicle 502 (e.g., stored remotely).

The perception component 520 can include functionality to perform object detection, segmentation, and/or classification. In some examples, the perception component 520 and/or the object detector 522 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 520 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

Further, the perception component 520 can include functionality to store perception data generated by the perception component 520. In some instances, the perception component 520 can determine a track corresponding to an object that has been classified as an object type. For purposes of illustration only, the perception component 520, using sensor system(s) 506 can capture one or more images of an environment. The sensor system(s) 506 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In general, the object detector 522 can detect (among other things) semantic objects represented by sensor data. In some examples, the object detector 522 can identify such semantic objects and can determine a two-dimensional or a three-dimensional bounding box associated with the object. The object detector 522 can determine covariance data associated with the object and/or a center point associated with the object, as discussed herein. The object detector 522 can determine additional information such as a location, orientation, pose, and/or size (e.g., length, width, height, etc.) associated with the object. The object detector 522 can send data to other components of the system 500 for localization and/or determining calibration information, as discussed herein.

In general, the epipolar component 524 can determine calibration information based on epipolar geometry. For example, the epipolar component 524 can receive an indication that two objects are the same object and are represented in sensor data captured by various sensors. The epipolar component 524 can determine an epipolar plane and/or an epipolar line for evaluating a consistency of sensors, as discussed herein. For example, the epipolar component 524 can determine a distance between a center point associated with an object and an epipolar line associating sensor data from two sensors. The epipolar component 524 can determine an epipolar plane and/or an epipolar line based on intrinsic and/or extrinsic sensor calibration parameter representing a pose of various sensor(s).

In general, the error component 526 can receive distance data from the epipolar component 524 and can aggregate the distances to determine an error over time associated with one or more sensors. In some examples, an error over time may represent (or may be expected to represent) a Gaussian distribution of errors centered around an epipolar line. By aggregating distances, the error component 526 can determine if an error is outside a range of acceptable errors. If an error is determined, the error component 526 can determine that two sensors are not consistent and may flag the sensors for further maintenance or other actions, as discussed herein.

The localization component 528 can include functionality to receive data from the sensor system(s) 506 and/or other components to determine a position of the vehicle 502. For example, the localization component 528 can include and/or request/receive a three-dimensional map of an environment and can continuously determine a location of the autonomous vehicle within the map. In some instances, the localization component 528 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 520 can provide data to various components of the vehicle 502 to determine an initial position of an autonomous vehicle for generating a trajectory, as discussed herein.

Further, the localization component 528 can receive map data representing semantic objects and can receive detections of such semantic objects in sensor data for determining a location of the vehicle 502, as discussed herein.

The projection component 530 can include functionality to project sensor data representing semantic object(s) into captured sensor data for object matching, as discussed here.

The distance component 532 can include functionality to determine a distance between a semantic map object and a corresponding sensed object. The distance component 532 can update an estimated location of the vehicle to globally minimize the distances. That is, a global minimum of distances may indicate that an estimated location has been determined by the localization component 528.

The prediction component 534 can generate one or more probability maps representing prediction probabilities of possible locations of one or more objects in an environment. For example, the prediction component 534 can generate one or more probability maps for vehicles, pedestrians, animals, and the like within a threshold distance from the vehicle 502. In some instances, the prediction component 534 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 536 can determine a path for the vehicle 502 to follow to traverse through an environment. For example, the planning component 536 can determine various routes and paths and various levels of detail. In some instances, the planning component 536 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 536 can generate an instruction for guiding the autonomous vehicle along at least a portion of the route from the first location to the second location. In at least one example, the planning component 536 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 536 can alternatively, or additionally, use data from the perception component 520 and/or the prediction component 534 to determine a path for the vehicle 502 to follow to traverse through an environment. For example, the planning component 536 can receive data from the perception component 520 and/or the prediction component 534 regarding objects associated with an environment. Using this data, the planning component 536 can determine a route to travel from a first location (e.g., a current location) to a second location (e.g., a target location) to avoid objects in an environment. In at least some examples, such a planning component 536 may determine there is no such collision free path and, in turn, provide a path which brings vehicle 502 to a safe stop avoiding all collisions and/or otherwise mitigating damage.

The memory 518 can further include one or more maps 538 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 538 can include at least one map (e.g., images and/or a mesh). In some examples, the vehicle 502 can be controlled based at least in part on the map(s) 538. That is, the map(s) 538 can be used in connection with the perception component 520 (and sub-components), the localization component 528 (and sub-components), the prediction component 534, and/or the planning component 536 to determine a location of the vehicle 502, identify objects in an environment, generate prediction probabilit(ies) associated with objects and/or the vehicle 502, and/or generate routes and/or trajectories to navigate within an environment.

In at least one example, the computing device 504 can include one or more system controller(s) 540, which can be configured to control steering, propulsion, braking, safety, emitters, communication, and other systems of the vehicle 502. These system controller(s) 540 can communicate with and/or control corresponding systems of the drive system(s) 514 and/or other components of the vehicle 502, which may be configured to operate in accordance with a path provided from the planning component 536.

The vehicle 502 can connect to computing device(s) 544 via network 542 and can include one or more processor(s) 546 and memory 548 communicatively coupled with the one or more processor(s) 546. In at least one instance, the one or more processor(s) 546 can be similar to the processor(s) 516 and the memory 548 can be similar to the memory 518. In the illustrated example, the memory 548 of the computing device(s) 544 stores a remote operation component 550 and/or a model component 552. In at least one instance, the model component 552, after empirical testing and/or simulations, can include the models for determining a location and/or determining a calibration parameter, as discussed herein. Though depicted as residing in the memory 548 for illustrative purposes, it is contemplated that the remote operation component 550 and the model component 552 can additionally, or alternatively, be accessible to the computing device(s) 544 (e.g., stored in a different component of computing device(s) 544 and/or be accessible to the computing device(s) 544 (e.g., stored remotely).

As discussed herein, the remote operation component 550 can include functionality to receive an indication of calibration parameter(s), sensor data associated with such calibration parameter(s), and/or a request for preventative maintenance. In some examples, the remote operation component 550 can schedule a maintenance operation based on a calibration parameter or a determination by the vehicle 502 that a calibration parameter is indicative of a degraded state. In some examples, a remote operation component 550 can include teleoperators or operators who can control the vehicle 502 or can provide instructions to the vehicle based on a calibration parameter.

The model component 552 can include functionality to generate models for determining a location and/or determine a calibration parameter, as discussed herein. For example, the model component 552 can receive sensor data and can determine calibration parameter(s) associated with such sensor data. The model component 552 can aggregate data across a plurality of vehicles (e.g., a fleet of vehicles) to determine calibration parameters indicative of normal operations and calibration parameters indicative of degraded operations. Further, the model component 552 can associate calibration parameter s with a time period of operating a sensor and a performance of components associated with such metrics to determine a predictive maintenance schedule associated with various sensors, as discussed herein.

The processor(s) 516 of the computing device 504 and the processor(s) 546 of the computing device(s) 544 can be any suitable processor capable of executing instructions to process data and perform operations as described herein. By way of example and not limitation, the processor(s) 516 and 546 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 computing device 504 and the memory 548 of the computing device(s) 544 are examples of non-transitory computer-readable media. The memory 518 and 548 can store an operating system and one or more software applications, instructions, programs, and/or data to implement the methods described herein and the functions attributed to the various systems. In various implementations, the memory 518 and 548 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 518 and 548 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Accordingly, the techniques discussed herein provide techniques for localizing a vehicle in an environment and for determining calibration information associated with sensors of the vehicle.

FIGS. 1, 2, 6, and 7 illustrate example processes in accordance with examples of the disclosure. These process are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

Figure 6:
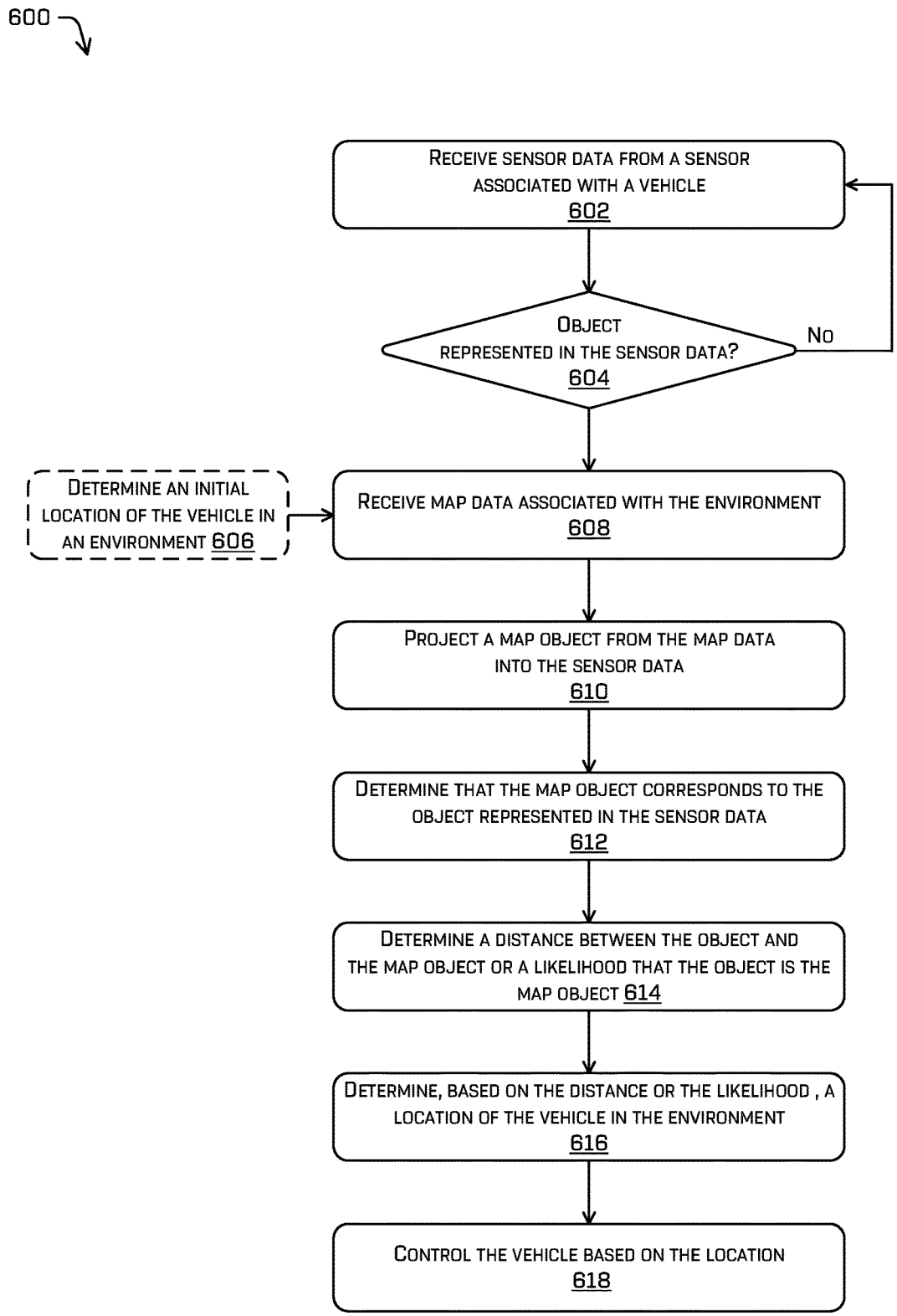
FIG. 6 is an example process for determining a location of a vehicle in an environment.

FIG. 6 is an example process for determining a location of a vehicle in an environment. For example, some or all of the process 600 can be performed by one or more components in FIG. 5, as described herein. For example, some or all of the process 600 can be performed by the perception component 520 and/or the localization component 528.

At operation 602, the process can include receiving sensor data from a sensor associated with a vehicle. In some examples, the operation 602 can include receiving or capturing image data from one or more image sensors of an autonomous vehicle as the autonomous vehicle traverses an environment. In some examples, the operation 602 can include receiving or capturing lidar data from one or more image sensors of an autonomous vehicle as the autonomous vehicle traverses an environment. Of course, other sensor types are contemplated herein.

The operation 602 can include receiving or determining bounding boxes associated with objects, such as semantic objects, in an environment. Examples of semantic objects include, but are not limited to, traffic lights, lane markings, signs, poles, and the like. If there are no semantic objects (e.g., determined in operation 604), the process returns to the operation 602 to capture additional data of the environment.

If there are semantic objects represented in the sensor data (e.g., "yes" in the operation 604, the operation continues to 608.

At operation 606, the process can include determining an initial location of the vehicle in an environment. In some examples, the operation 606 can include determine a coarse estimate of a location to provide the location to the operation 608 for receiving map data. The initial location can be determined according to any techniques discussed herein.

At operation 608, the process can include receiving map data associated with the environment. In some examples, the map data can be received based on the initial location of the vehicle in the environment and/or based on a classification type of the objects captured in the operation 602. Additional details of receiving or determining map data are discussed in connection with FIG. 3, as well as throughout the disclosure.

At operation 610, the process can include projecting a map object from the map data into the sensor data. The operation 610 can be based on the three-dimensional location of the map object and an orientation of a sensor capturing the sensor data. In some examples, the operation 610 can include projecting a three-dimensional map object into a two-dimensional representation, such as image data.

At operation 612, the process can include determining that the map object corresponds to the object represented in the sensor data. For example, the operation 612 can include matching or otherwise determining based on a size, shape, classification type, that the map object is the same as the sensed object. In some examples, the operation 612 can be based at leas in part on a Hungarian method, a greedy search algorithm, and the like.

At operation 614, the process can include determining a distance between the object and the map object or a likelihood that the object is the map object. As discussed in connection with FIGS. 1 and 2, the distance can correspond to a distance between a center point of the map object and a center point of the object represented in the sensor data.

At operation 616, the process can include determining, based at least in part on the distance or the likelihood, a location of the vehicle in the environment. In some examples, the operation 616 can be based at least in part on a localization algorithm such as SLAM (simultaneous localization and mapping), particle filtering, and the like.

At operation 618, the process can include controlling the vehicle based at least in part on the location. In some examples, the operation 618 can include, but is not limited to, receiving a trajectory for the vehicle to follow, determining a trajectory for the vehicle to follow, controlling the vehicle to follow a trajectory, sending information to a remote teleoperator, determining a stopping trajectory, and the like.

Figure 7:
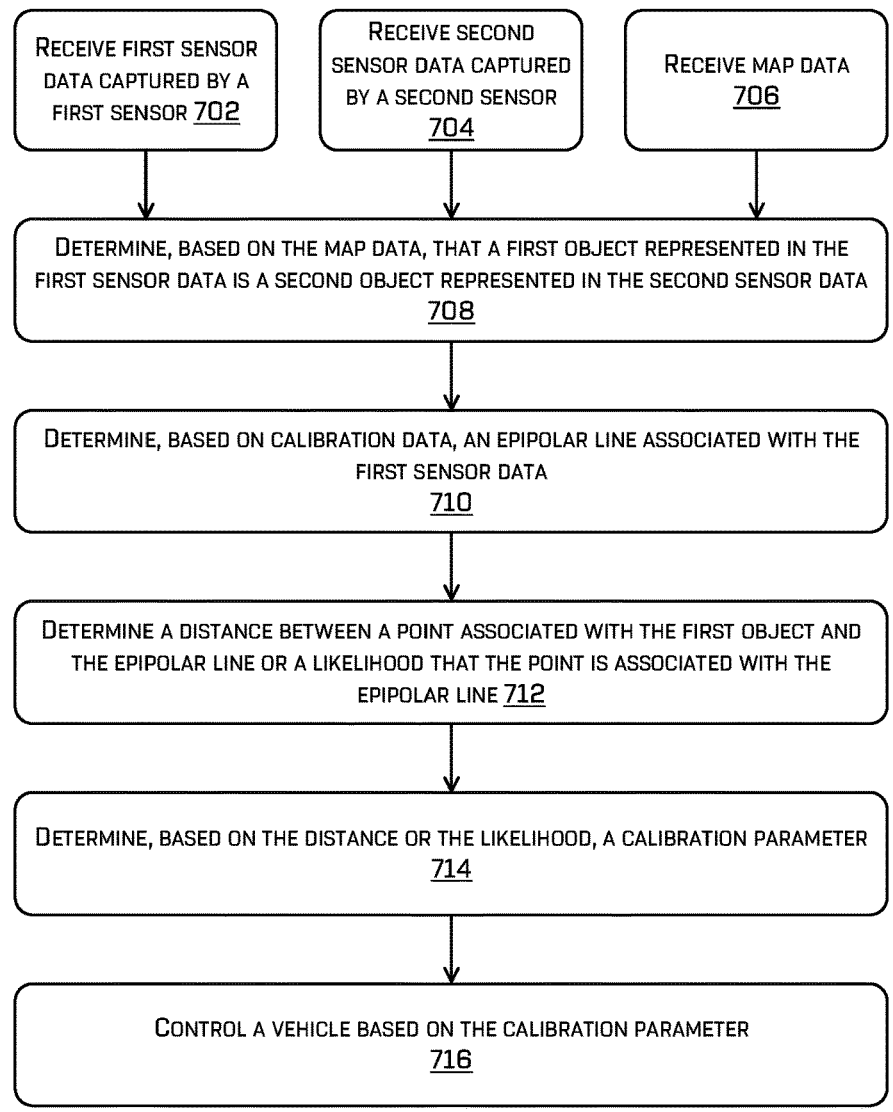
FIG. 7 is an example process for determining a calibration parameter for a sensor based on map data.

FIG. 7 is an example process for determining a calibration parameter for a sensor based on map data. For example, some or all of the process 700 can be performed by one or more components in FIG. 5, as described herein. For example, some or all of the process 700 can be performed by the perception component 520 and/or the localization component 528.

At operation 702, the process can include receiving first sensor data captured by a first sensor.

An operation 704 can include receiving second sensor data captured by a second sensor.

In some examples, the first sensor and/or the second sensor can include image sensors, lidar sensors, radar sensors, time of flight sensors, and the like. In some examples, a field of view of the first sensor can at least partly overlap with a second field of view of the second sensor. In some examples, the fields of view of the first and second sensors may not overlap.

In some examples, the operations 702 and 704 are performed substantially (within technical tolerances). In some examples, the operations 702 and 704 may occur a different times, although in such cases, locations of the first sensor and the second sensor may be determined to compensate, adjust, or otherwise consider a change of poses/locations of the sensors for the purposes of determining a calibration parameter.

An operation 706 can include receiving map data. Aspects of receiving map data are discussed in connection with FIGS. 1, 2, and 3, as well as throughout this disclosure.

At operation 708, the process can include determining, based at least in part on map data, that a first object represented in the first sensor data is a second object represented in the second sensor data. Techniques for performing the operation 708 are discussed in connection with FIGS. 1 and 2, as well as throughout the disclosure.

At operation 710, the process can include determining, based at least in part on calibration data, an epipolar line associated with the first sensor data. In some examples, the calibration data may include one or more extrinsic parameters and/or intrinsic parameters. In some examples, the calibration data can include data to generate an epipolar line, and may include but is not limited to an essential matrix associated with the first sensor and/or the second sensor, a fundamental matrix associated with the first or second sensors, orientation information, and the like.

Although the operation 710 is discussed in the context of determining the epipolar line for the first sensor, the operation 710 may additionally or alternatively be performed in the context of the second sensor.

At operation 712, the process can include determining a distance between a point associated with the first object and the epipolar line or a likelihood that the point is associated with the epipolar line. Additional details associated with the operation 712 are discussed in connection with FIG. 2, as well as throughout this disclosure.

At operation 714, the process can include determining, based at least in part on the distance or the likelihood, a calibration parameter. In some examples, the calibration parameter can represent a level of consistency between the first sensor and the second sensor. Additional details associated with the operation 714 are discussed in connection with FIG. 2, as well as throughout this disclosure.

At operation 716, the process can include controlling the vehicle based at least in part on the calibration parameter. In some examples, the operation 716 can include, but is not limited to, receiving a trajectory for the vehicle to follow, determining a trajectory for the vehicle to follow, controlling the vehicle to follow a trajectory, sending information to a remote teleoperator, determining a stopping trajectory, determining that a sensor is miscalibrated, and the like.

Although discussed in the context of a first sensor and a second sensor, the process 700 can be implemented based on receiving sensor data from any number of sensors.

Example Clauses

A: A system comprising: one or more processors; and one or more non-transitory computer-readable media storing computer-executable instructions that, when executed, cause the one or more processors to perform operations comprising: receiving sensor data from an image sensor associated with an autonomous vehicle in an environment; receiving map data associated with the environment; determining, based at least in part on the sensor data, a sensed object represented in the sensor data; projecting, based at least in part on a first location of the autonomous vehicle, a map object from the map data into the sensor data; determining that the sensed object is associated with the map object; determining a distance between the sensed object and the map object; determining, based at least in part on the distance, a second location of the autonomous vehicle in the environment; and controlling the autonomous vehicle based at least in part on the location.

B: The system of paragraph A, the operations further comprising: determining, based at least in part on at least one of the first location of the autonomous vehicle in the map data or an object type, a threshold distance; and receiving the map data based at least in part on the threshold distance.

C: The system of paragraph A or B, the operations further comprising: determining that the sensed object is associated with a classification; and determining that the map object is associated with the classification.

D: The system of any of paragraphs A-C, wherein the map object comprises a first center point and first covariance data, the operations further comprising: determining a second center point and second covariance data associated with the sensed object; and determining the distance based at least in part on the first center point, the second center point, the first covariance data, and the second covariance data.

E: The system of any of paragraphs A-D, wherein the object comprises at least one of: a traffic light; a sign; a pole; or a lane marking.

F: A method comprising: receiving sensor data from a sensor associated with a vehicle in an environment; receiving map data associated with the environment, the map data comprising a map object; determining, based at least in part on the sensor data, a sensed object represented in the sensor data; projecting the map object into the sensor data; determining at least one of a distance between the sensed object and the map object or a likelihood that the sensed object is associated with the map object; and determining, based at least in part on the distance or the likelihood, a location of the vehicle in the environment.

G: The method of paragraph F, further comprising: controlling the vehicle based at least in part on the location.

H: The method of paragraph F or G, further comprising: projecting the map object into the sensor data based at least in part on an estimated location of the vehicle in the environment.

I: The method of any of paragraphs F-H, further comprising: determining, based at least in part on a location of the vehicle in map data or an object type, a threshold distance; and receiving the map data based at least in part on the threshold distance.

J: The method of any of paragraphs F-I, wherein the sensor data is first sensor data, the sensor is a first sensor, the sensed object is a first object, the map object is a first map object, the distance is a first distance, and the likelihood is a first likelihood, the method further comprising: receiving second sensor data from a second sensor associated with the vehicle; determining, based at least in part on the second sensor data and the map data, at least one of a second distance between a second object represented in the second sensor data and a second map object or a second likelihood that the sensed object is associated with the map object; and determining the location of the vehicle in the environment further based at least in part on the second distance or the second likelihood.

K: The method of any of paragraphs F-J, further comprising: determining that the map object is associated with the sensed object.

L: The method of any of paragraphs F-K, wherein the map object comprises a three-dimensional position and first covariance data, the method further comprising: projecting the three-dimensional position into the sensor data to determine a first center point; projecting the first covariance data into the sensor data to determine two-dimensional covariance data, the first covariance data representing three-dimensional covariance data; determining a second center point and second covariance data associated with the object; and determining the distance or the likelihood based at least in part on the first center point, the second center point, the two-dimensional covariance data, and the second covariance data.

M: The method of any of paragraphs F-L, wherein at least one of: the distance is a Mahalanobis distance; or the likelihood is based at least in part on a size of covariance data, the covariance data associated with the sensed object or the map object.

N: The method of any of paragraphs F-M, wherein the sensor comprises at least one of an image sensor, a lidar sensor, a radar sensor, or a time-of-flight sensor.

O: The method of any of paragraphs F-N, further comprising: determining that the sensed object is associated with a classification type; determining that the map object is associated with the classification type; and determining the distance or the likelihood based at least in part on the sensed object and the map object being associated with the classification type.

P: One or more non-transitory computer-readable media storing instructions executable by a processor, wherein the instructions, when executed, cause the processor to perform operations comprising: receiving sensor data from a sensor associated with a vehicle in an environment; receiving map data associated with the environment, the map data comprising a map object; determining, based at least in part on the sensor data, a sensed object represented in the sensor data; projecting the map object into the sensor data; determining at least one of a distance between the sensed object and the map object or a likelihood that the sensed object is associated with the map object; and determining, based at least in part on the distance or the likelihood, a location of the vehicle in the environment.

Q: The one or more non-transitory computer-readable media of paragraph P, wherein the sensor data is first sensor data, the sensor is a first sensor, the sensed object is a first object, the map object is a first map object, the distance is a first distance, and the likelihood is a first likelihood, the operations further comprising: receiving second sensor data from a second sensor associated with the vehicle; determining, based at least in part on the second sensor data and the map data, at least one of a second distance between a second object represented in the second sensor data and a second map object or a second likelihood that the second object is associated with the second map object; and determining the location of the vehicle in the environment further based at least in part on the second distance or the second likelihood.

R: The one or more non-transitory computer-readable media of paragraph P or Q, wherein the map object comprises a three-dimensional position and first covariance data, the operations further comprising: projecting the three-dimensional position into the sensor data to determine a first center point; determining a second center point and second covariance data associated with the object; and determining the distance or the likelihood based at least in part on the first center point, the second center point, the first covariance data, and the second covariance data.

S: The one or more non-transitory computer-readable media of any of paragraphs P-R, the operations further comprising: determining that the sensed object is associated with a classification type; determining that the map object is associated with the classification type; and determining the distance or the likelihood based at least in part on the sensed object and the map object being associated with the classification type.

T: The non-transitory computer-readable media of any of paragraphs P-S, wherein the sensed object comprises at least one of: a traffic light; a sign; a pole; or a lane marking.

U: A system comprising: one or more processors; and one or more non-transitory computer-readable media storing computer-executable instructions that, when executed, cause the one or more processors to perform operations comprising: receiving sensor data from a first sensor associated with an autonomous vehicle in an environment; receiving sensor data from a second sensor associated with the autonomous vehicle; receiving semantic map data associated with the environment; determining that first sensor data from the first sensor and second sensor data from the second sensor correspond to a semantic object determined based at least in part on the semantic map data; determining, based at least in part on calibration data, the first sensor data, and epipolar geometry, a distance between a point associated with the second sensor data and an epipolar line; determining, based at least in part on the distance, a calibration parameter associated with at least one of the first sensor or the second sensor; and controlling the autonomous vehicle based at least in part on the calibration parameter.

V: The system of paragraph U, the operations further comprising: determining, based at least in part on the distance, an error over time; and determining the calibration parameter based at least in part on the error over time; wherein the calibration parameter is indicative of whether the first sensor and the second sensor are inconsistent.

W: The system of paragraph U or V, wherein the first sensor is a first image sensor comprising a first field of view and the second sensor is a second image sensor comprising a second field of view at least partially overlapping the first field of view.

X: The system of any of paragraphs U-W, the operations further comprising: determining the point associated with the second object based at least in part on covariance data associated with the second object.

Y: The system of any of paragraphs U-X, the operations further comprising: determining an action for the autonomous vehicle based at least in part on the calibration parameter.

Z: A method comprising: receiving first sensor data from a first sensor; receiving second sensor data from a second sensor; receiving semantic map data associated with an environment; determining, based on the semantic map data, that a semantic object is represented in the first sensor data and the second sensor data; and determining, based at least in part on epipolar geometry, the first sensor data, and the second sensor data, a calibration parameter associated with at least one of the first sensor or the second sensor.

AA: The method of paragraph Z, further comprising: controlling, based at least in part on the calibration parameter, a vehicle to perform at least one of: downweighting data from at least one of the first sensor or the second sensor; restricting a direction of travel of the vehicle; reducing a speed of the vehicle; or stopping the vehicle.

AB: The method of paragraph Z or AA, wherein the first sensor is a first image sensor comprising a first field of view and the second sensor is a second image sensor comprising a second field of view at least partially overlapping the first field of view.

AC: The method of any of paragraphs Z-AB, wherein the first sensor is a first image sensor comprising a first field of view and the second sensor is a second image sensor comprising a second field of view that does not overlap the first field of view.

AD: The method of any of paragraphs Z-AC, wherein the first sensor data is captured at substantially a same time as the second sensor data.

AE: The method of any of paragraphs Z-AD, further comprising: determining, based at least in part on calibration data and a first point associated with the first sensor data, an epipolar line; determining at least one of a distance between a second point associated with the second sensor data and the epipolar line or a likelihood that the second point is associated with the epipolar line; and determining the calibration parameter based at least in part on the distance or the likelihood.

AF: The method of paragraph AE, wherein the calibration data is based at least in part on a first pose of the first sensor and a second pose of the second sensor.

AG: The method of any of paragraphs Z-AF, further comprising: determining, based at least in part on the calibration parameter, an error over time; wherein the calibration parameter is indicative of whether the first sensor and the second sensor are inconsistent.

AH: The method of any of paragraphs Z-AG, wherein the determining that the semantic object is represented in the first sensor data and the second sensor data comprises: determining, based at least in part on the first sensor data, a first sensed object represented in the first sensor data; determining a classification type of the first sensed object; and projecting, based at least in part on the classification type, a map object from the semantic map data into the first sensor data.

AI: The method of any of paragraphs Z-AH, wherein the calibration parameter is a first calibration parameter, the method further comprising: receiving third sensor data from a third sensor associated with the vehicle; determining, based on the semantic map data, that the semantic object is represented in the third sensor data; determining, based at least in part on the epipolar geometry, a second calibration parameter associated with at least one of the first sensor or the third sensor; and determining, based at least in part on the first calibration parameter and the second calibration parameter, a calibration state of the first sensor.

AJ: One or more non-transitory computer-readable media storing instructions executable by a processor, wherein the instructions, when executed, cause the processor to perform operations comprising: receiving first sensor data from a first sensor; receiving second sensor data from a second sensor; receiving semantic map data associated with an environment; determining, based on the semantic map data, that a semantic object is represented in the first sensor data and the second sensor data; and determining, based at least in part on epipolar geometry, the first sensor data, and the second sensor data, a calibration parameter associated with at least one of the first sensor or the second sensor.

AK: The one or more non-transitory computer-readable media of paragraph AJ, the operations further comprising: controlling, based at least in part on the calibration parameter, a vehicle to perform at least one of: downweighting data from at least one of the first sensor or the second sensor;

restricting a direction of travel of the vehicle; reducing a speed of the vehicle; or stopping the vehicle.

AL: The one or more non-transitory computer-readable media of paragraph AJ or AK, the operations further comprising: determining, based at least in part on calibration data and a first point associated with the first sensor data, an epipolar line; determining at least one of a distance between a second point associated with the second sensor data and the epipolar line or a likelihood that the second point is associated with the epipolar line; and determining the calibration parameter based at least in part on the distance or the likelihood.

AM: The one or more non-transitory computer-readable media of any of paragraphs AJ-AL, the operations further comprising: determining, based at least in part on the calibration parameter, an error over time; and wherein the calibration parameter is indicative of whether the first sensor and the second sensor are inconsistent.

AN: The non-transitory computer-readable media of any of paragraphs AJ-AM, wherein the determining that the semantic object is represented in the first sensor data and the second sensor data comprises: determining, based at least in part on the first sensor data, a first sensed object represented in the first sensor data; determining a classification type of the first sensed object; and projecting, based at least in part on the classification type, a map object from the semantic map data into the first sensor data.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
receiving first sensor data from a first sensor associated with an autonomous vehicle in an environment;
receiving second sensor data from a second sensor associated with the autonomous vehicle;
receiving semantic map data associated with the environment based at least in part on a number of semantic objects within a threshold distance of the autonomous vehicle;
determining that first sensor data from the first sensor and second sensor data from the second sensor correspond to a semantic object determined based at least in part on the semantic map data;
determining a center point and covariance data associated with semantic object;
determining, based at least in part on calibration data, the first sensor data, and epipolar geometry, a distance between the center point associated with the second sensor data and an epipolar line;
determining, based at least in part on the distance, a calibration parameter associated with at least one of the first sensor or the second sensor; and
controlling the autonomous vehicle based at least in part on the calibration parameter,
wherein the threshold distance is based on at least one of:
a classification type of the semantic objects in the environment,
a frequency of the semantic objects in the environment, or
a location in the semantic map data.

2. The system of claim 1, the operations further comprising:
determining, based at least in part on the distance, an error over time; and
determining the calibration parameter based at least in part on the error over time;
wherein the calibration parameter is indicative of whether the first sensor and the second sensor are inconsistent.

3. The system of claim 1, wherein the first sensor is a first image sensor comprising a first field of view and the second sensor is a second image sensor comprising a second field of view at least partially overlapping the first field of view.

4. The system of claim 1, the operations further comprising:
determining the center point associated with the semantic object based at least in part on the covariance data associated with the semantic object.

5. The system of claim 1, the operations further comprising:
determining an action for the autonomous vehicle based at least in part on the calibration parameter.

6. A method comprising:
receiving first sensor data from a first sensor associated with a vehicle in an environment;
receiving second sensor data from a second sensor associated with the vehicle;
receiving semantic map data associated with the environment based at least in part on a number of semantic objects within a threshold distance of the vehicle;
determining, based on the semantic map data, that a semantic object is represented in the first sensor data and the second sensor data;

determining a center point and covariance data associated with semantic object;
determining, based at least in part on epipolar geometry, the first sensor data, the second sensor data, and the center point, a calibration parameter associated with at least one of the first sensor or the second sensor; and
controlling, based at least on the calibration parameter, the vehicle,
wherein the threshold distance is based on at least one of:
a classification type of the semantic objects in the environment,
a frequency of the semantic objects in the environment, or
a location in the semantic map data.

7. The method of claim 6, wherein controlling the vehicle causes the vehicle to perform at least one of:
downweighting data from at least one of the first sensor or the second sensor;
restricting a direction of travel of the vehicle;
reducing a speed of the vehicle; or
stopping the vehicle.

8. The method of claim 6, wherein the first sensor is a first image sensor comprising a first field of view and the second sensor is a second image sensor comprising a second field of view at least partially overlapping the first field of view.

9. The method of claim 6, wherein the first sensor is a first image sensor comprising a first field of view and the second sensor is a second image sensor comprising a second field of view that does not overlap the first field of view.

10. The method of claim 6, wherein the first sensor data is captured at substantially a same time as the second sensor data.

11. The method of claim 6, further comprising:
determining, based at least in part on calibration data and a first center point associated with the first sensor data, an epipolar line;
determining at least one of a distance between a second center point associated with the second sensor data and the epipolar line or a likelihood that the second center point is associated with the epipolar line; and
determining the calibration parameter based at least in part on the distance or the likelihood.

12. The method of claim 11, wherein the calibration data is based at least in part on a first pose of the first sensor and a second pose of the second sensor.

13. The method of claim 6, further comprising:
determining, based at least in part on the calibration parameter, an error over time;
wherein the calibration parameter is indicative of whether the first sensor and the second sensor are inconsistent.

14. The method of claim 6, wherein the determining that the semantic object is represented in the first sensor data and the second sensor data comprises:
determining, based at least in part on the first sensor data, a first sensed object represented in the first sensor data;
determining a classification type of the first sensed object; and
projecting, based at least in part on the classification type of the first sensed object, a map object from the semantic map data into the first sensor data.

15. The method of claim 6, wherein the calibration parameter is a first calibration parameter, the method further comprising:
receiving third sensor data from a third sensor associated with the vehicle;
determining, based on the semantic map data, that the semantic object is represented in the third sensor data;
determining, based at least in part on the epipolar geometry, a second calibration parameter associated with at least one of the first sensor or the third sensor; and
determining, based at least in part on the first calibration parameter and the second calibration parameter, a calibration state of the first sensor.

16. One or more non-transitory computer-readable media storing instructions executable by a processor, wherein the instructions, when executed, cause the processor to perform operations comprising:
receiving first sensor data from a first sensor associated with a vehicle in an environment;
receiving second sensor data from a second sensor associated with the vehicle;
receiving semantic map data associated with the environment based at least in part on a number of semantic objects within a threshold distance of the vehicle;
determining, based on the semantic map data, that a semantic object is represented in the first sensor data and the second sensor data;
determining a center point and covariance data associated with semantic object;
determining, based at least in part on epipolar geometry, the first sensor data, the second sensor data, and the center point, a calibration parameter associated with at least one of the first sensor or the second sensor; and
controlling the vehicle based at least in part on the calibration parameter,
wherein the threshold distance is based on at least one of:
a classification type of the semantic objects in the environment,
a frequency of the semantic objects in the environment, or
a location in the semantic map data.

17. The one or more non-transitory computer-readable media of claim 16, wherein controlling the vehicle causes the vehicle to perform at least one of:
downweighting data from at least one of the first sensor or the second sensor;
restricting a direction of travel of the vehicle;
reducing a speed of the vehicle; or
stopping the vehicle.

18. The one or more non-transitory computer-readable media of claim 16, the operations further comprising:
determining, based at least in part on calibration data and a first center point associated with the first sensor data, an epipolar line;
determining at least one of a distance between a second center point associated with the second sensor data and the epipolar line or a likelihood that the second center point is associated with the epipolar line; and
determining the calibration parameter based at least in part on the distance or the likelihood.

19. The one or more non-transitory computer-readable media of claim 16, the operations further comprising:
determining, based at least in part on the calibration parameter, an error over time; and
wherein the calibration parameter is indicative of whether the first sensor and the second sensor are inconsistent.

20. The non-transitory computer-readable media of claim 16, wherein the determining that the semantic object is represented in the first sensor data and the second sensor data comprises:
determining, based at least in part on the first sensor data, a first sensed object represented in the first sensor data;

determining a classification type of the first sensed object; and projecting, based at least in part on the classification type of the first sensed object, a map object from the semantic map data into the first sensor data.

\* \* \* \* \*